UNITED STATES PATENT OFFICE.

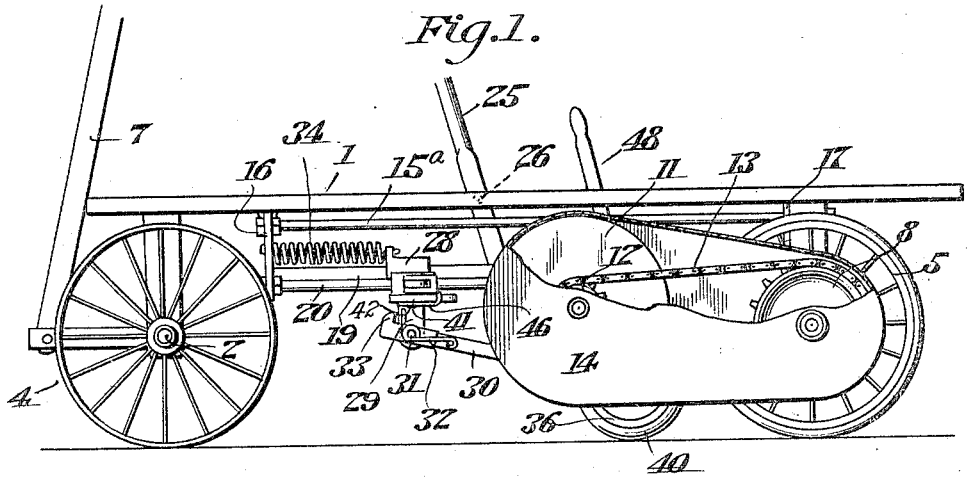
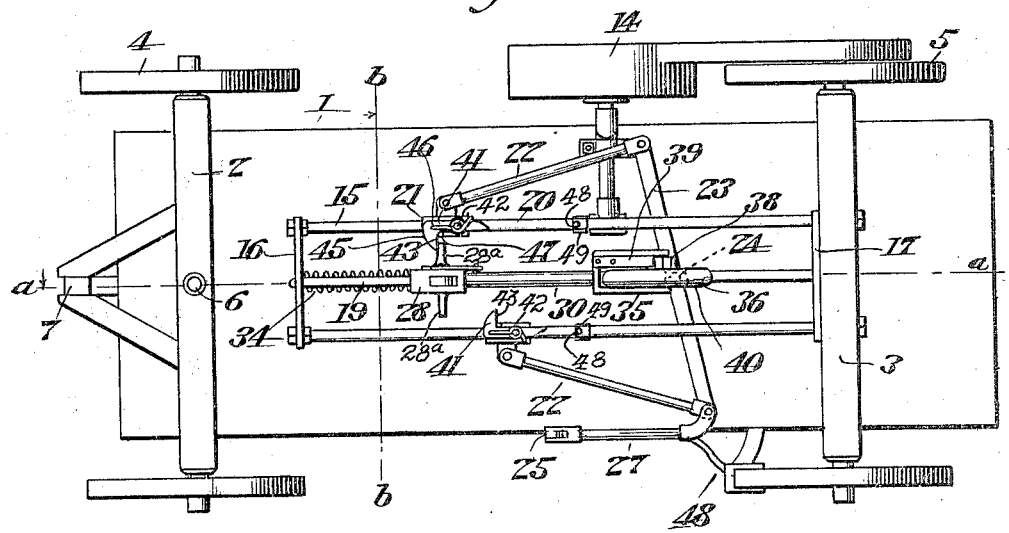

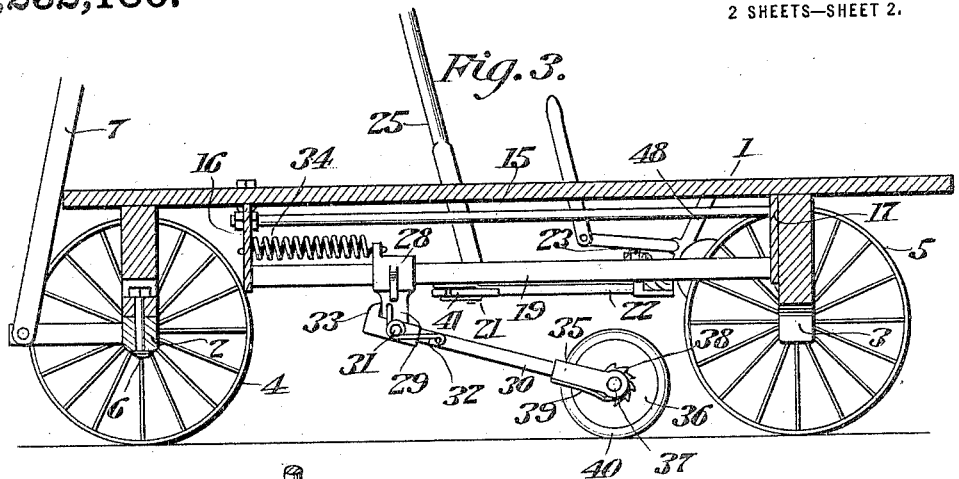
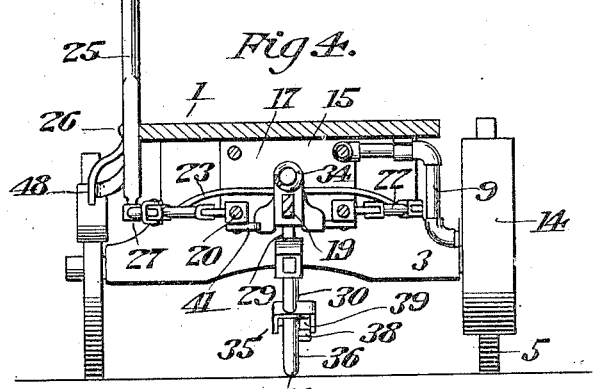
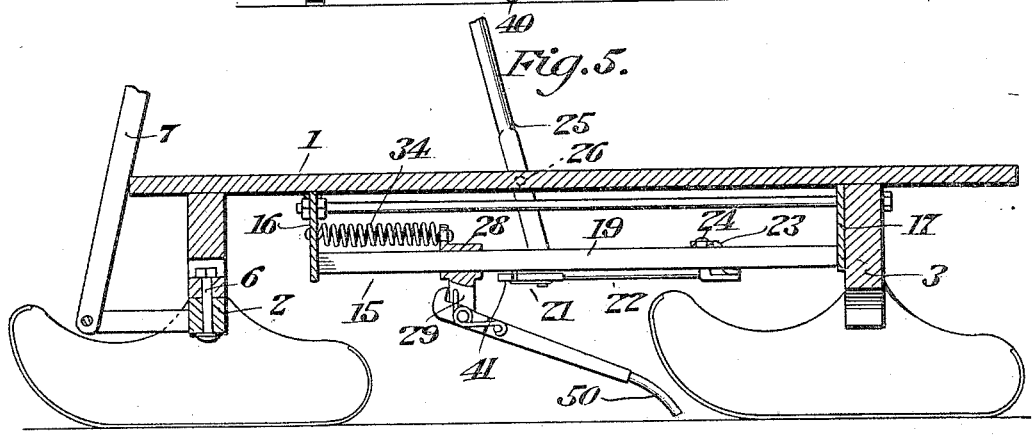

HENRY ISADORE BEAUDRY, OF RIVER ROUGE, MICHIGAN.

COASTER-WAGON.

1,232,186.   Specification of Letters Patent.   Patented July 3, 1917.

Application filed March 31, 1916.   Serial No. 88,070.

*To all whom it may concern:*

Be it known that I, HENRY I. BEAUDRY, a citizen of the United States, residing at River Rouge, in the county of Wayne and State of Michigan, have invented new and useful Improvements in Coaster-Wagons, of which the following is a specification.

This invention is an improved coaster vehicle such as a wagon, sled, or the like, the object of the invention being to provide a vehicle of this kind with improved propelling mechanism adapted to be manually operated by the rider and by means of which the vehicle can be rapidly and easily propelled on a road or on ice, or the like, and may be caused to coast from time to time as desired.

The invention consists in the construction, combination, and arrangement of devices, hereinafter described and claimed, reference being had to the accompanying drawings, in which:

Figure 1 is a side elevation of a wagon provided with propelling and coasting mechanism constructed and arranged in accordance with my invention.

Fig. 2 is an inverted plan of the same.

Fig. 3 is a detail longitudinal sectional view of the same on the plane indicated by the line $a$—$a$ of Fig. 2.

Fig. 4 is a detail transverse sectional view of the same on the plane indicated by the line $b$—$b$ of Fig. 2.

Fig. 5 is a longitudinal sectional view of a sled provided with propelling mechanism embodying a modification of my invention.

Referring to the form of the invention shown in Figs. 1 and 2, the body of the wagon is indicated at 1, the front axle at 2, the rear axle at 3, the front wheels at 4, and the rear wheels at 5. The front axle is pivotally mounted as at 6 and a tongue 7 is here shown for turning said axle and guiding or steering the vehicle. Any suitable means may be employed for this purpose, within the scope of my invention. One of the rear wheels is provided with a sprocket wheel 8. A standard 9 depends from one side of the body and has a stub shaft 10 on which a fly wheel 11 is mounted for rotation. Said fly wheel is of suitable size and weight and is provided with a sprocket wheel 12. An endless sprocket chain 13 connects the sprocket wheels 8 and 12 and hence when the vehicle is in motion, the fly wheel is rotated by power imparted thereto from one of the rear wheels. When the rider discontinues the operation of the propelling mechanism, the fly wheel by its own momentum continues to revolve for a considerable period and in so doing, causes the vehicle to be coasted, power from the fly wheel being communicated to the said rear wheel of the vehicle through the sprocket wheels and sprocket chain as will be understood. The fly wheel also causes an even forward motion to be imparted to the vehicle when the propelling mechanism is operated. A suitable casing 14 is provided to inclose and protect the wheels and sprocket chain.

I will now describe the propelling mechanism. A frame 15 is provided which comprises front and rear cross members 16, 17, longitudinal bars 15ª which connect said cross members, a centrally arranged longitudinal bar 19, and a pair of guide bars 20 which are parallel with the bar 19 and spaced from opposite sides thereof. A block 21 is mounted for reciprocating movement on each guide rod and has an opening through which said guide rod extends. In practice, the various bars or rods of the frame may be made of tubing. Any suitable material may be employed and I do not desire to limit myself in this particular. The blocks 21 are connected by pitmen 22 to the ends of a rocker bar 23, the central portion of which is pivotally connected to the bar 19 as at 24. A lever 25 is pivotally mounted as at 26 at one side of the body and its lower end is connected by a pitman 27 to one end of the rocker bar. Hence, the user of the vehicle by manually operating the lever may cause the rocker bar and pitmen 22 to impart reciprocating motion to the blocks 21 and cause said blocks to move simultaneously in reverse directions.

I also provide a pusher which is mounted for reciprocating movement. In the form of the invention shown in Figs. 1 and 2, the pusher comprises a block 28 mounted for reciprocating movement on the centrally arranged bar 19 and having a depending standard 29 to which a pusher arm 30 is pivotally connected as at 31. Said block also has arms 28ª which project from opposite sides thereof. A spring 32 is provided which depresses the rear end of the pusher arm and said pusher arm has a stop 33 at its front end to limit the upward pivotal movement of the pusher arm. A spring 34 is attached to the cross piece 16 of the frame and to the block 28 and serves to draw the pusher forwardly. The arm 30 has a fork 35 at its rear end in which a pusher wheel 36 is mounted, the axle of the pusher wheel being shown at 37 mounted in bearings in the arms of the fork and being also provided with a ratchet wheel 38. The ratchet wheel is engaged by a spring pawl 39. Said pawl and ratchet wheel permit the pusher wheel to rotate clockwise and prevent it from rotating counterclockwise. The pusher wheel has a friction tire 40 to bear on the ground, ice, or other surface on which the vehicle operates and this friction tire may be made of rubber or any other suitable material.

Each block 21 carries a pusher operating rod 41 which is pivotally mounted thereon as at 42 and is provided at the front end with an inwardly extending shoulder 43 the extreme front end of each dog being oblique to form a camming surface 45. Associated with each dog is a spring 46 to press its shoulder 43 into the path of one of the arms 28ª of the pusher block 28, a stop pin 47 being also provided to limit such inward movement of the front end of each dog. It will be understood that as each dog is carried rearwardly by its block 21, its shoulder 43 will engage one of the arms 28ª of the pusher block and hence impart a rearward pushing stroke or vehicle propelling stroke to the pusher, the other dog, on its simultaneously forward movement by the engagement of its camming end with the other arm 28ª, being moved out of the way of such other arm. During each rearward or pushing stroke of the pusher, its pusher wheel is locked against rotation, so that an efficient pushing impulse is imparted to the vehicle and as the pusher is moved forwardly by the spring, the ratchet wheel and pawl permit the pusher wheel to rotate on the road surface, thus avoiding friction and hence offering no resistance to the forward movement of the vehicle imparted thereto by the preceding rear stroke of the pusher.

For releasing the dogs at the end of the active stroke I provide pins 48 which project downwardly from sleeves 49 secured on the guide bars 20. These pins engage the inclined ends of the dogs as the latter reach the end of the active stroke, and hence turn the dogs on their pivots and disengage their shoulders from the arms 28ª as will be understood.

A suitable brake mechanism is indicated at 48 for coaction with one of the rear wheels and to control the movement of the vehicle.

In the modified form of the invention shown in Fig. 5, the fly wheel and its connections are dispensed with, the vehicle is shown as a sled, the pusher wheel is also dispensed with, and the pusher arm is provided with an ice engaging point 50.

Having described the invention, what is claimed is:

1. In a vehicle of the class described, a pusher mounted for reciprocating movement, a spring to move the pusher forwardly, a pair of elements mounted for reciprocating movement simultaneously in reverse directions, means to actuate said elements, and pusher operating means on said elements arranged to move forwardly independently of and to engage and move rearwardly with the pusher.

2. In a vehicle of the class described, a pusher element mounted for reciprocating movement and having arms on opposite sides, a spring to move the pusher element forwardly, a pair of elements mounted for reciprocating movement simultaneously in reverse directions, means to actuate said elements, a dog pivotally mounted on each of said elements and having a shoulder to engage one of the said arms at each rear stroke of said element and also having a cam face to engage said arm and turn said shoulder out of the path of said arm at each forward stroke of said element, springs to normally hold the dogs with their shoulders in the paths of said arms and means to release the dogs from said arms at the ends of said rear strokes of said dogs.

In testimony whereof I affix my signature in presence of two witnesses.

HENRY ISADORE BEAUDRY.

Witnesses:
  MAGGIE WALLER,
  ALEX MILLER.

Copies of this patent may be obtained for five cents each, by addressing the "Commissioner of Patents, Washington, D. C."